Jan. 27, 1970     MEGUMU SHIO     3,492,059

MONOAXIAL COARSE-FINE ADJUSTMENT FOCUSING DEVICE IN MICROSCOPE

Filed March 20, 1968

# United States Patent Office

3,492,059
Patented Jan. 27, 1970

3,492,059
MONOAXIAL COARSE-FINE ADJUSTMENT FOCUSING DEVICE IN MICROSCOPE
Megumu Shio, Kawasaki-shi, Japan, assignor to Nippon Kogaku K.K., Tokyo, Japan, a corporation of Japan
Filed Mar. 20, 1968, Ser. No. 714,689
Claims priority, application Japan, Mar. 31, 1967
(utility model), 42/26,731
Int. Cl. G02b 7/04
U.S. Cl. 350—46                                    3 Claims

ABSTRACT OF THE DISCLOSURE

This invention relates to a monoaxial coarse-fine adjustment focusing device in a microscope which comprises forming a differential gear mechanism between the coarse adjustment handle and fine adjustment handle provided coaxially, forming one of the re-focusing position setting pieces on said coarse adjusting handle, forming the other re-focusing position setting pieces into a ring member rotatably provided on the pinion case, providing a twisting spring between the two setting pieces to be press-contacted to each other always, screwing up the operation ring for setting the re-focusing position onto the pinion case to be contacted to the back of the said ring member, providing the friction ring fitted rotatably to the coarse adjustment handle to be pressed by friction adjusting member screwed up on the pinion case through several intermediate pins movably provided through the pinion case, and has the effect that not only re-focusing position setting can be performed but the fine adjustment can be also done even after the setting of re-focusing position, and the friction given to the coarse adjustment handle can be optionally adjusted.

---

This invention relates to the focusing device in a microscope, and in particular, the focusing device of monoaxial coarse-fine adjustment device in a microscope which comprises providing the differential gear mechanism between the coaxially provided fine adjustment handle and the coarse adjustment handle, providing the re-focusing position setting means to the effect that fine adjustment can be done even after having set the re-focusing position, and the friction given to the coarse adjustment handle can be optionally adjusted.

Among the conventional focusing device of a microscope, there are a system according to which coarse adjustment and fine adjustment are carried out by two separate dovetail means, and a monoaxial coarse-fine adjustment system according to which coarse-fine adjustment are carried out by a differential gear mechanism on one dovetail means, and in the former conventional system, the dovetail means which is demanded accurate moving, must be provided at two positions, and therefore the machining and assembling or such like operations become very complicated, which are the drawback of this system, and in the latter system, such an inconvenience as in the former system can be remarkably eliminated, but another drawback which is different from the former system, is resulted in relation to the re-focusing device.

Generally speaking, the monoaxial coarse-fine adjustment focusing device having a single dovetail means is one of the indispensable factors of a high grade microscope, and in most cases, it is strongly demanded that re-focusing device should be provided for the high grade microscope of this kind, but, in accordance with the system having a single dovetail means, the controlling means for re-focusing device cannot be provided on the dovetail means which is the simplest structure. The reason for this is that, when the controlling means is provided on the dovetail means, the controlling means performs the controlling effect against the fine adjusting operation, and therefore, after having set the re-focusing position, the fine adjustment cannot be performed, and when the operation is forcibly carried out, the gears are stripped as a result.

The object of present invention is to provide a monoaxial coarse-fine adjustment focusing device satisfactorily used in a microscope of high class having a single dovetail means, wherein the coarse-fine adjustment is carried out by a differential gear mechanism, and means for setting re-focusing position having no such drawbacks as mentioned above, can be provided and the means for optionally adjusting the friction given to the coarse handle, is also available. And, in accordance with this invention, it is possible to easily provide the means for setting re-focusing position on the monoaxial coarse-fine adjustment device, and at the same time, from the stand point of the structure, the combination of the coarse-fine adjustment device and the means for setting re-focusing position can be simply carried out, and in addition, the friction to be given to the coarse adjustment handle can be optionally adjusted, and there are many advantages from the practical point of view.

In accordance with this invention, a monoaxial coarse-fine adjustment device is provided for a microscope, wherein one of the two outer toothed gears which are provided coaxially and have different number of teeth, is provided on the pinion shaft fixedly, and the other one of the said gears is provided within the coarse adjustment handle fixedly, the planetary gear in mesh with the said two gears is provided to be interlocked with the fine adjustment handle, and these members form a differential gear mechanism, and one of the re-focusing position setting piece is formed on the coarse adjustment handle and the other re-focusing position setting piece is fixed on the ring member provided rotatably on the pinion case, and a twisting spring is provided between the two setting pieces so that the latter can be respectively press-contacted to each other always, and the operation ring for setting the re-focusing position is screwed up onto the pinion case to be contacted to the back of the ring member, and the friction ring fitted rotatably to the coarse adjustment handle, is provided to be pressed by friction adjustment member which is screwed up on the pinion case through several intermediate pins provided movably through the pinion case.

This invention will be described more clearly referring to the illustrative embodiment shown in the attached drawing, in which.

Figure 1:
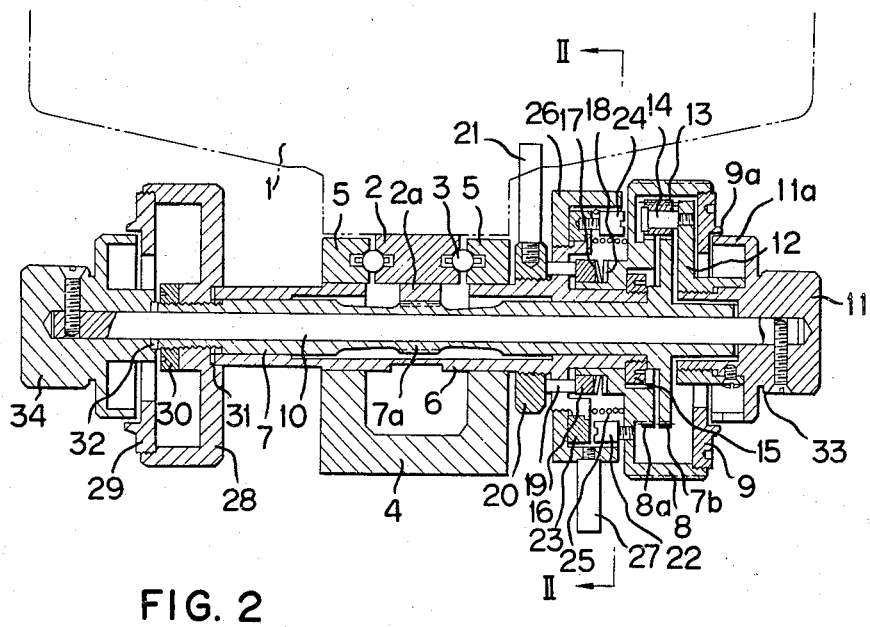
FIG. 1 is a cross sectional view of the co-axial adjustment shafts of an embodiment of this invention.
Figure 2:
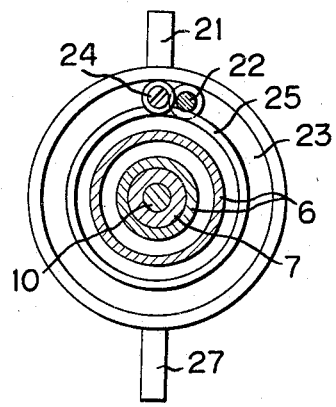
FIG. 2 is a cross sectional view taken along II—II line showing the controlling portion for the re-focusing position setting.
Figure 3:
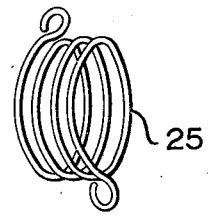
FIG. 3 is a perspective view showing the free state of a coil spring.

Referring first to FIG. 1; 1 is a stage; 2 is a male ball race provided on the stage 1, and on one of the surface thereof, a rack 2a is provided, and both sides thereof are fitted slidably to a ball race 5 of a stand 4 through balls 3; 6 is a pinion case fixed to with the stand 4, and the portion where the rack 2a is inserted is cut off; 7 is a pinion shaft rotatably fitted into the pinion case 6 and in the center portion thereof a pinion 7a to be meshed with the rack 2a is provided, and in the neighbourhood of the right end thereof, an outer toothed gear 7b is provided; 8 is a coarse adjustment handle on the right to be rotatably fitted to the outer periphery of the pinion case 6, and inside of said coarse adjustment handle 8, an outer toothed gear 8a whose diameter is the same with that of the` outer toothed gear 7b is formed. One of the two gears 7b and 8a is a profile shifted gear and the number of teeth of the said gear is predetermined to be different from the number of the teeth of the other gear by one or several teeth; 9 is a cover screwed up on the right side coarse adjustment handle 8, and an index 9a for a fine adjustment scale 11a which is described hereinafter, is provided on the projection of the cover; 10 is a shaft for fine adjustment rotatably fitted into the pinion shaft 7; 11 is a right side fine adjustment handle fixed to the fine adjustment shaft 10 to be rotated as one piece, and the scale 11a is provided on the large diameter portion; 12 is an arm member fixed on the right fine adjustment handle 11; 13 is a planetary gear rotatably pivoted by a shaft 14 provided on the arm member 12, and is meshed with the two gears 7b and 8a; 15 is a nut; 16 is a friction ring fitted movably and rotatably on the right side coarse adjustment handle 8; 17 is a cup shape spring washer; 18 is a washer; 19 are several intermediate pins provided movably through the pinion case 6, and the intermediate pins 19 can be formed as one piece with the friction ring 16; 20 is a friction adjustment ring screwed up onto the pinion case, and an operation rod 21 is fixed on the outer periphery thereof; 22 is a moving pin fixed on the end surface of the right side coarse adjustment handle 8; 23 is a ring member rotatably provided on the pinion case 6 between the flange portion of the pinion case 6 and the inside of the operation ring 26 for re-focusing position setting which is described hereinafter, and on the surface thereof, a stop pin 24 is fixed; 25 is a coil spring as is shown in FIG. 3 which is provided between the setting piece 22 and 24, and as is shown in FIG. 2, it is hooked in such a manner that it is enforced by a half turn to the effect that the two pins can be press-contacted to each other; 26 is an operation ring for refocusing position setting screwed up onto the pinion case 6 and the internal surface thereof can be contacted to the back of the ring member 23, and on the outer periphery thereof an operation rod 27 is fixed; 28 is a left side coarse adjustment handle fixed on the pinion shaft 7; 29 is a cover thereof; 30 is a nut; 31, 32 and 33 are washers, respectively; 34 is a left side fine adjustment handle fixed on the fine adjustment shaft 10.

This invention has such a structure as has been explained so far, and therefore when coarse adjustment is carried out, first the operation ring 26 for setting refocusing position is rotated to make the ring member 23 rotatable freely, and then the coarse adjustment handle 8 or 28 is rotated, and when the operation ring 26 for refocusing position setting is rotated to release the close contact with the ring member 23, the ring member 23 is disconnected from the flange portion of the pinion case 6 fixed to the stand 4, and it can be rotated freely, and by the force of the coil spring 25, the pins 22 and 24 are connected to each other. Thus, the ring member 23, pins 22 and 24, and the coil spring 25 are in such a position that they can be rotated along with the coarse adjustment handle 8. On the other hand, the left side coarse adjustment handle 28 rotates the pinion shaft 7 directly, and the right side handle 8 rotates the pinion shaft 7 through the planetary gear 13 and one of the outer gears 7b and 8a which are rotated as a unit, and therefore the stage 1 is moved up and down by the co-action of the pinion 7a and the rack 2a.

Next, when the fine adjustment is carried out, the fine adjustment handle 11 or 34 is rotated. The rotation of the fine adjustment handle 11 rotates the planetary gear 13 around the two outer toothed gears 7b and 8a through the arm member 12 and at the same time since the friction on the side of the coarse handle 8 due to the spring washer is large, the outer toothed gear 8 is not rotated but the planetary gear 13 is rotated about the shaft 14 so that only the outer toothed gear 7b of the pinion shaft is rotated in accordance with the difference of the number of the teeth of the two outer toothed gears 7b and 8a, and the operation thereof is transmitted to the stage 1 through the pinion 7a and the rack 2a. Therefore, the amount of up and down movement of the stage per one turn of the fine adjustment handle 11 or 34, becomes remarkably small when compared with the case of the coarse adjustment. Thus, fine adjustment can be attained. The adjustment of the rotation resistance of the coarse adjustment handle 8 or 28 can be carried out by adjusting the deformation of the cup shape spring washer 17 by pressing the friction ring 16 through the intermediate pins 19 by rotating the friction adjusting ring 20.

Next, how to carry out the re-focusing position setting is explained. When the focusing position is determined by carrying out the coarse-fine adjustment operation the two pins 22 and 24 are rotated with the coarse adjustment handle 8 and then, the operation ring 26 for re-focusing position setting is rotated in the locking direction to tighten ring member 23. Thus, the ring member 23 is pressed to the flange portion of the pinion case 6 with the internal surface of the operation ring 26 for re-focusing position setting, and is fixed on the pinion case 6 at this position. Therefore, the set position of the stop pin 24 is determined so that the set position of the coarse adjustment is memorized. When the coarse adjustment handle 8 or 28 is rotated in the direction in which the stage 1 is lowered, the moving pin 22 is rotated with the handle 8 by one turn against the force of the coil spring 25 and therefore it can lower the stage 1 in correspondence with the said rotation. Thus, after having exchanged the samples, when the coarse adjustment handle 8 or 28 is rotated in the raising direction and the moving pin 22 again engages the stop pin 24 in the determined position. The rotation of the handle is halted so that stage 1 is returned to the first focusing position and refocusing may thus be carried out. In this case, position, and re-focusing can be carried out. In this case, when the stage 1 should be more or less moved up and down because of the "Präparat" or samples, the fine adjustment handle 11 or 34 can be rotated, and the fine adjustment can be carried out regardless of the position of the stop pin. After the operation ring 26 for re-focusing position setting is rotated and tighten, the stop pin 24 is fixed in the pinion case 6 and the moving pin 22 which is provided on the coarse adjustment handle 8, is press-contacted, and this becomes to control against the rotation, and the coarse adjustment handle 8 or 28 cannot be rotated in the direction in which the stage 1 is raised.

What is claimed is:
1. A monoaxial coarse-fine adjustment focusing device of a microscope having a set stop mechanism comprising:
   a pinion case fixed on the microscope and having a flange portion,
   a pinion shaft operably connected to the raising and lowering mechanism of the microscope and rotatably supported in and extending through said pinion case,
   a coarse adjustment handle frictionally rotatable on the outer surface of said pinion case adjacent said microscope,
   a fine adjustment handle rotatably supported on said pinion shaft closely adjacent said course adjustment handle and having a planetary gear attached thereto,
   two adjacent coaxial outer toothed gears meshed with said planetary gear and having a different number of teeth, the first outer toothed gear being fixed on one end of said pinion shaft, the second outer toothed gear being fixed on said coarse adjustment handle, and
   adjustable set stop means for resetting said coarse adjustment handle at the focusing set position thereof, including
   a ring member rotatable on the flange portion of said pinion case,
   a manual member operably associated with said pinion case and locking said ring member on said flange portion, a first pin fixed on said coarse adjustment handle and moved therewith, a second pin circumferentially spaced in overlapping relationship with said first pin and fixed on said ring member to moved with said ring member, and a spring member attached to said first and second pins and biasing said two pins toward each other, whereby when said ring member is unlocked by said manual member, said second pin is rotated with said coarse adjustment handle, and when said ring member is locked, the rotation of said coarse adjustment handle in the raising direction is prevented by said second pin, said coarse adjustment handle being rotatable toward the lowering direction against the biasing force of said spring member.

2. A device according to claim 1, wherein said spring member is a coil spring provided around said pinion case and is enforced by a half turn to the effect that said two pins are biased toward each other.

3. A device according to claim 1, further comprising friction adjusting means including, a friction ring fitted rotatably to said coarse adjustment handle, a friction adjusting ring threaded on said pinion case, and intermediate pins provided through the flange portion and axially movable between said friction ring and said friction adjusting ring, whereby the rotation of said friction adjusting ring is not transmitted to said coarse adjustment handle.

References Cited

UNITED STATES PATENTS

| | | | |
|---|---|---|---|
| 2,360,268 | 10/1944 | Ott | 350—84 |
| 2,421,126 | 5/1947 | Ott | 350—84 |
| 2,579,195 | 12/1951 | Kurtz et al. | 350—84 |
| 3,019,705 | 2/1962 | Wilkinson | 350—84 |
| 3,135,817 | 6/1964 | Wrigglesworth et al. | 350—84 |

FOREIGN PATENTS 930,179   6/1955   Germany.

PAUL R. GILLIAM, Primary Examiner

U.S. Cl. X.R.

350—84